April 14, 1964   W. M. WILLIS ETAL   3,129,021
FLEXIBLE JOINT
Filed Dec. 3, 1959   4 Sheets-Sheet 1
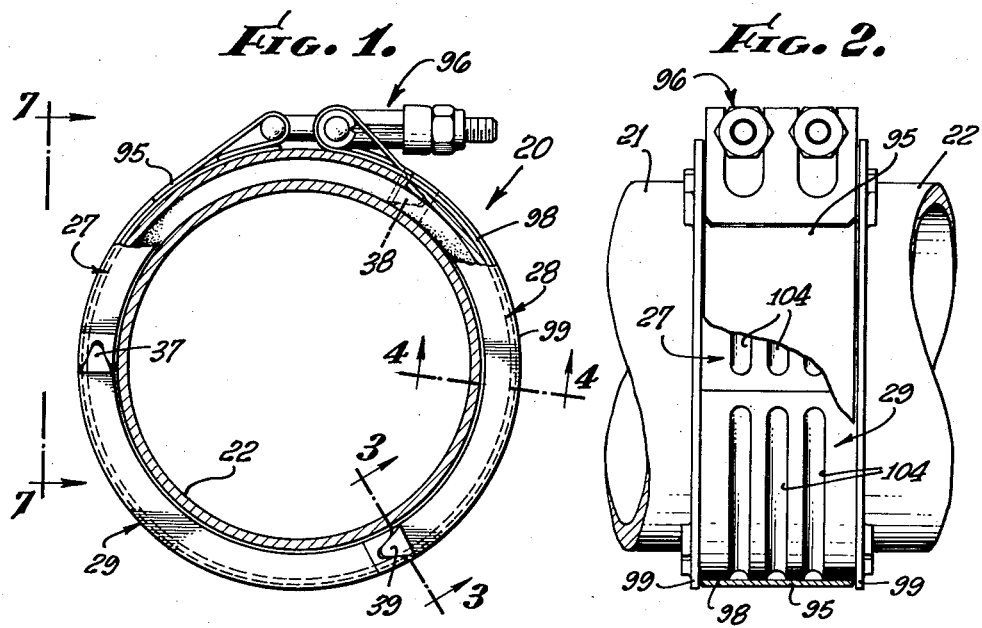
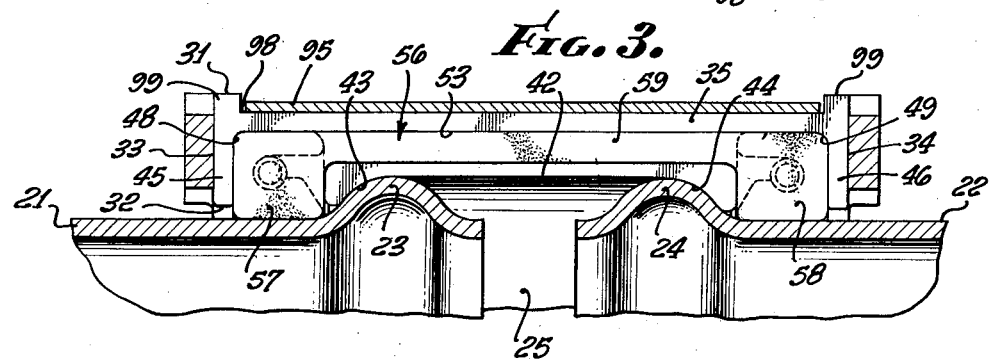
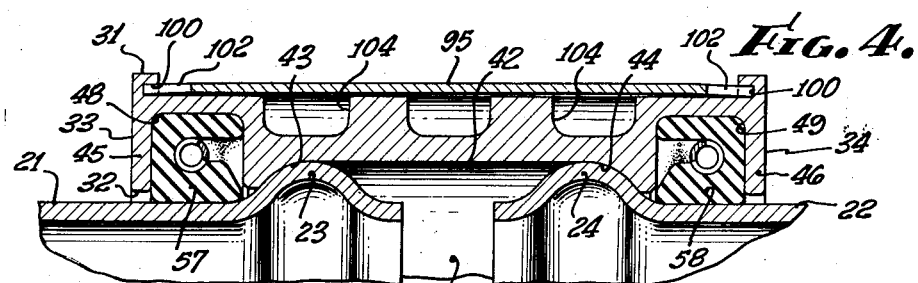
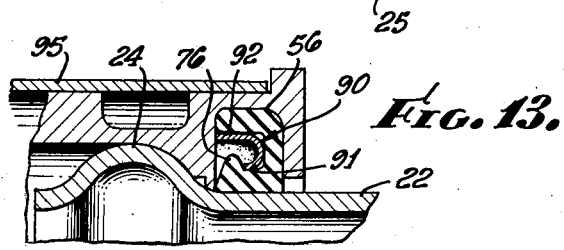
WILLIAM M. WILLIS
ROBERT W. GRAVES
INVENTORS
BY *Huebner & Worrel*
ATTORNEYS.

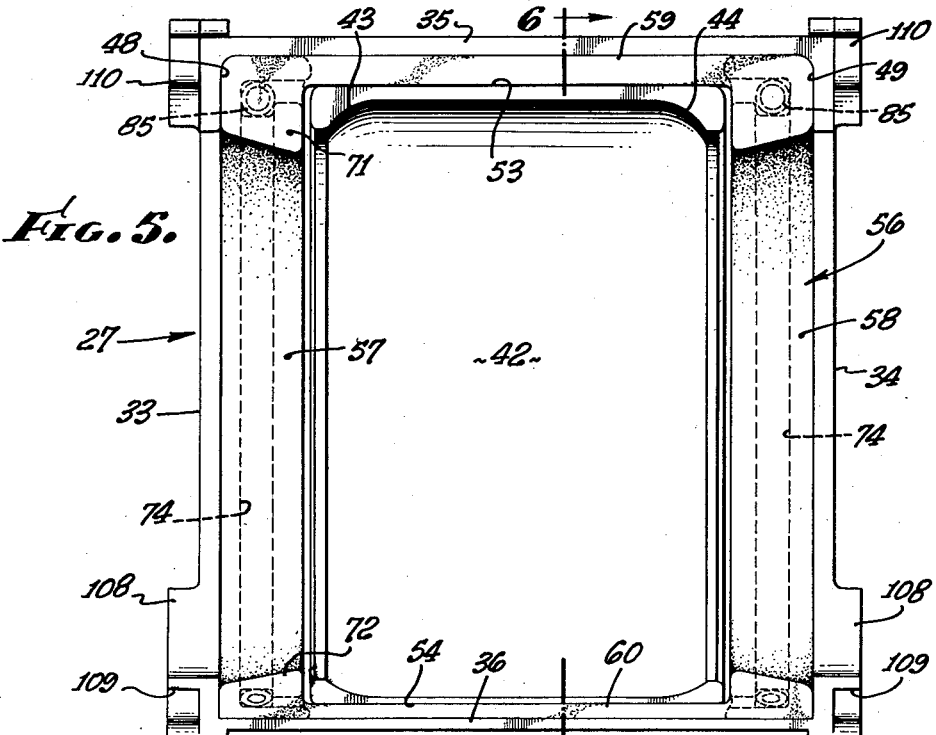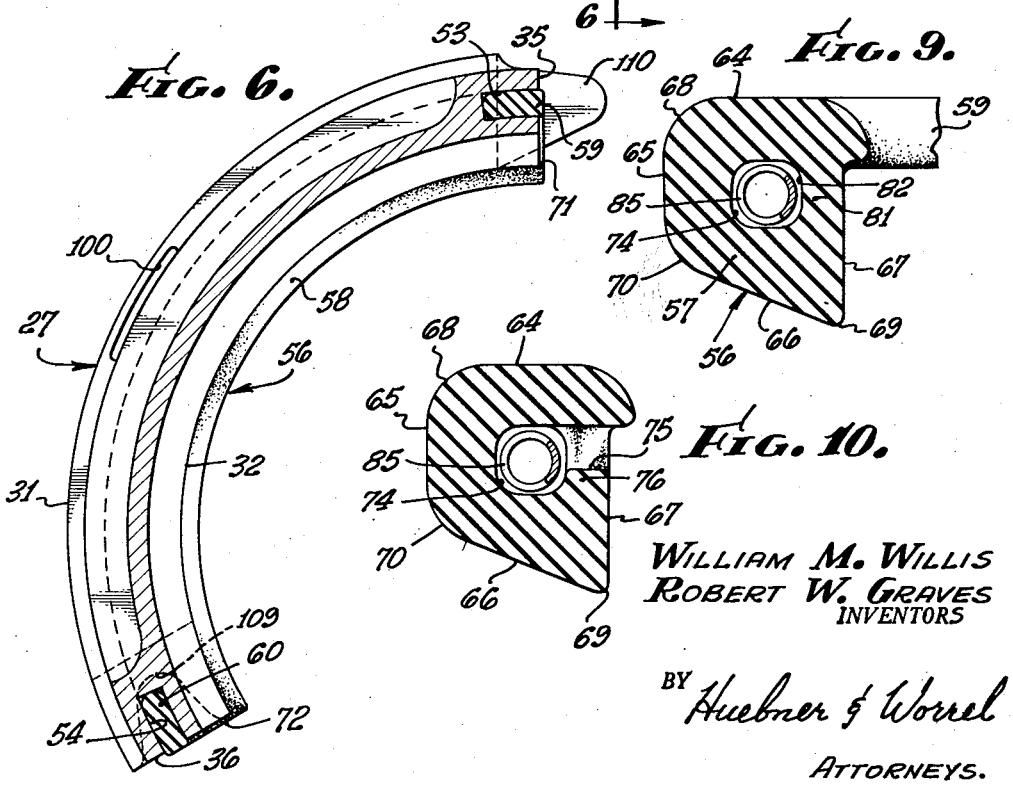

April 14, 1964   W. M. WILLIS ETAL   3,129,021
FLEXIBLE JOINT
Filed Dec. 3, 1959   4 Sheets-Sheet 3
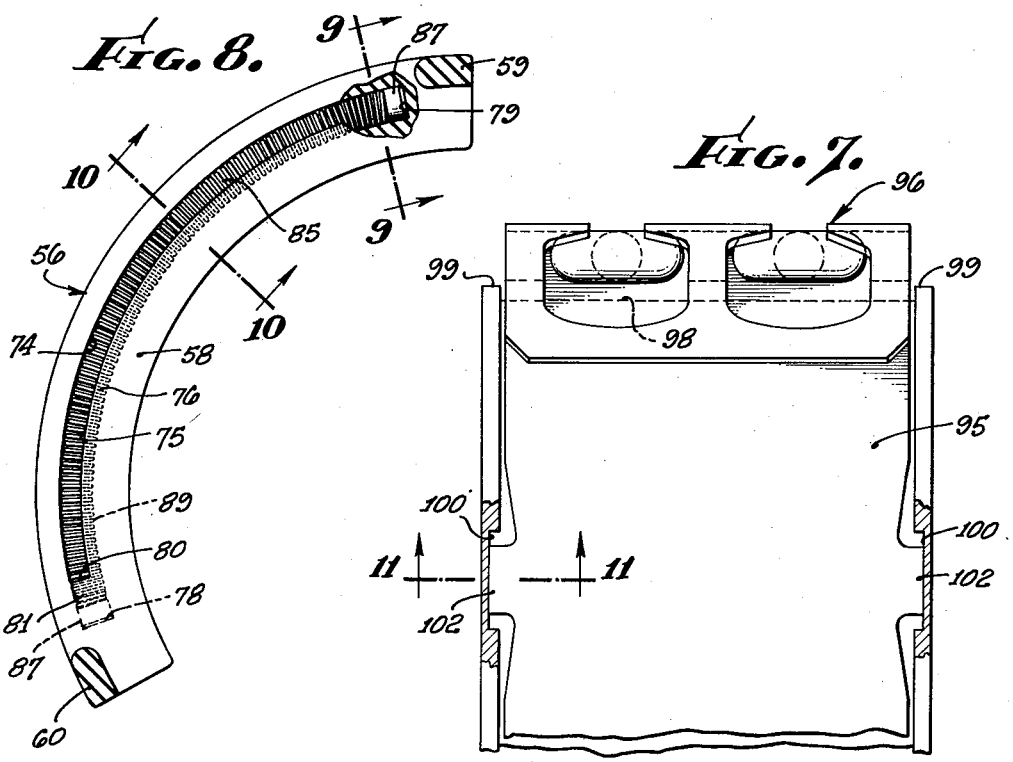
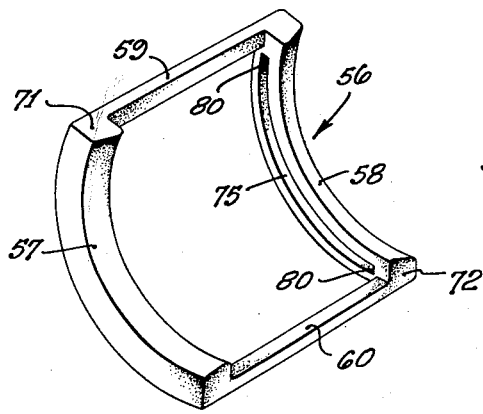
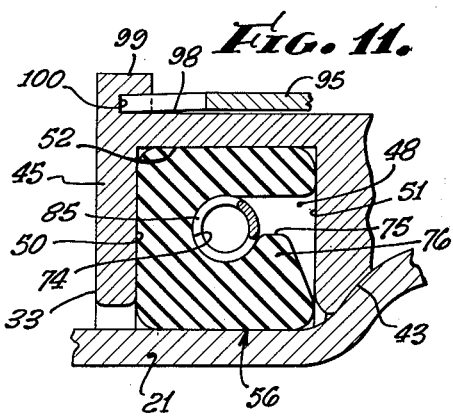
WILLIAM M. WILLIS
ROBERT W. GRAVES
INVENTORS.
BY Huebner & Worrel
ATTORNEYS.

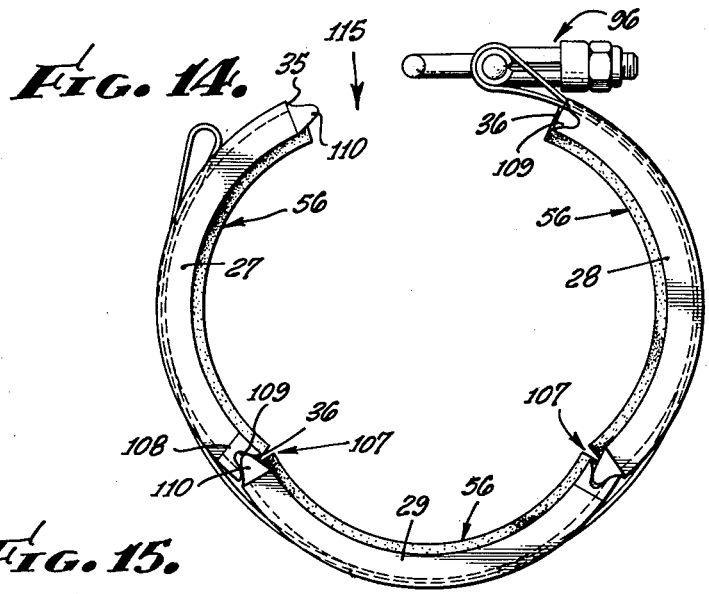
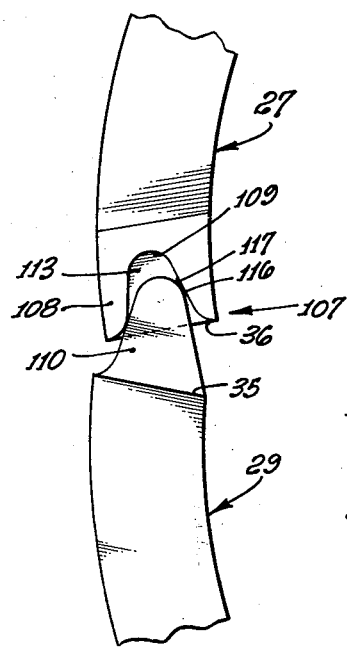
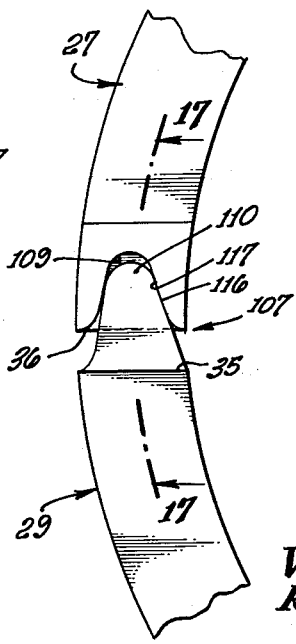
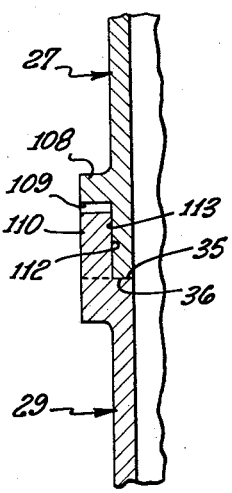
WILLIAM M. WILLIS
ROBERT W. GRAVES
INVENTORS.
BY Huebner & Worrel
ATTORNEYS.

United States Patent Office 3,129,021
Patented Apr. 14, 1964

3,129,021
FLEXIBLE JOINT
William M. Willis, Northridge, and Robert W. Graves, Canoga Park, Calif., assignors to Aeroquip Corporation, Jackson, Mich., a corporation of Michigan
Filed Dec. 3, 1959, Ser. No. 857,089
2 Claims. (Cl. 285—233)

This invention relates to a joint structure for interconnecting the ends of two tube sections in a fluid-tight connection providing for limited flexibility between the tube sections.

It is a general object of this invention to provide an improved joint structure which is especially well suited for interconnecting relatively light weight tube sections and which establishes a load-transmitting connection directly between annular beads formed on the adjacent ends of the tube sections for carrying mechanical loads in a fluid line system, the loads resulting from internal pressures, thermal distortions, vibrations, angular misalignment movements, and the like.

A specific object of this invention is to provide a joint structure of the above-mentioned character comprising collar segments having elastomer seal inserts with spring means for providing circumferential sealing pressure of one seal insert against another, and which will accommodate expansion of the seal material and will urge the seal material to follow movements of the tubing.

Another object of this invention is to provide a joint structure of the above-mentioned character which is adapted to be opened for placement around the ends of two tube sections in a direction transversely of the tube sections, and is adapted to be constricted around the tube sections, without disturbing the tube sections and without disturbing the elasomer seals in the collar segments thereof.

Further objects and advantages of this invention will appear during the course of the following part of this specification wherein the details of construction and mode of operation of a preferred embodiment are described with reference to the accompanying drawing, in which:

FIG. 1 is a cross section through a line of tubing equipped with a joint structure embodying the invention, portions of the joint structure being shown in side elevation and portions being cut away and shown in section;

FIG. 2 is a side elevation of the tubing with the joint structure mounted on it, and with portions of the joint structure being cut away;

FIGS. 3 and 4 are enlarged fragmentary axial sections taken on lines 3—3 and 4—4, respectively, of FIG. 1;

FIG. 5 is a view in elevation and on an enlarged scale of the inside of a collar segment of the joint structure;

FIG. 6 is a section taken along line 6—6 of FIG. 5;

FIG. 7 is a fragmentary view in elevation of the joint structure, with portions thereof being cut away, and being viewed generally in the direction of arrows 7—7 of FIG. 1;

FIG. 8 is a side view on an enlarged scale through the elastomer seal insert, with portions cut away, as taken on line 6—6 of FIG. 5;

FIGS. 9 and 10 are fragmentary cross sections on an enlarged scale and taken on lines 9—9 and 10—10, respectively, of FIG. 8;

FIG. 11 is a detail section on an enlarged scale taken along line 11—11 of FIG. 7;

FIG. 12 is a perspective view of a seal insert for a joint structure of this invention;

FIG. 13 is an axial section through a portion of a joint structure having another form of spring mounted in the elastomer seal insert thereof;

FIG. 14 is a side elevation of the joint structure in open position for encircling two tube sections to be interconnected;

FIG. 15 is a detail view in side elevation of the interengaging end portions of two collar segments of the joint structure, shown in joint-open position;

FIG. 16 is a detail view corresponding to FIG. 15 but showing the parts in joint-closed position; and FIG. 17 is a detail section taken along line 17—17 of FIG. 16.

Referring to the drawings in detail, the invention is shown therein as the same may be embodied in a coupling, designated generally by reference numeral 20, for interconnecting the ends of tube sections 21 and 22. The tube sections are provided near their ends with annular external beads 23 and 24, respectively, and are separated by a gap 25.

Coupling 20 comprises a plurality of arcuate segments arranged in end toward end relationship to form the coupling as a cylindrical collar which encircles and spans the beads of the tube sections. In the illustrated embodiment there are three such arcuate segments, the same being designated by reference numerals 27, 28, and 29, respectively, each being of an arc length of 120°. Each segment has an outside surface 31, an inside surface 32, side surfaces 33 and 34, and end faces 35 and 36. When the segments are arranged around the end portions of the tube to be coupled and are constricted radially inwardly to provide fluid-tight seals as will be described hereinafter, it is preferred that the end faces of each segment be in contact with the end face or end faces, respectively, of its next adjacent segment or segments, as is shown in the drawing. In FIG. 1, the places at which the segments are in end face abutment with each other are represented at 37, 38, and 39, respectively.

Each collar segment is of inwardly opening channel-shaped cross section. More specifically, each segment has a shallow channel formed in the inside surface thereof to extend circumferentially through the end faces 35 and 36. The bottom wall of such channel is designated by reference numeral 42 and the opposed side walls by numerals 43 and 44, respectively. Thus, two flanges 45 and 46 are provided by the channel structure just described, and these extend radially inwardly of the segments to define the sides 43 and 44, respectively, of the channel.

The side walls 43 and 44 of the channel, being inside walls of the flanges, are arcuate, and preferably conform to the curvature of the beads 23 and 24 on the tubes, thus to provide an endward and radial load-bearing connection which permits sliding engagement of the inside walls of the flanges against the remote sides of the tube beads. When limited angular misalignment occurs in the tube sections, the tube beads 23 and 24 will fulcrum and slide against the arcuate inside walls 43 and 44 of the flanges as in a ball-and-socket joint.

The flanges 45 and 46 have respective grooves 48 and 49 formed therein of generally rectangular cross section and opening to the inside surface of the collar segments. The side walls, of these grooves are designated by numerals 50 and 51 (FIG. 11), and the bottom wall by numeral 52. The end faces 35 and 36 of a collar segment are disposed in axial planes and have longitudinally extending grooves 53 and 54 (FIG. 6) formed therein, respectively. These end grooves extend to the ends of the flange grooves 48 and 49.

A seal insert for each collar segment is shown in FIG. 12 and is designated generally by reference numeral 56. It is a molded seal of elastomer and is shaped to be fitted into the side grooves 48, 49 and the end grooves 53 and 54. Preferably, the elastomer is such as is flexible at minus 65° F. and has a maximum of 25% swell when subjected to soaking in liquid hydrocarbon fuels at 70° F. Fluorinated silicone elastomers have these characteristics. Seals molded from silicone elastomers are highly resistant to chemicals, oils and other compounds which adversely affect rubber, and possess relatively high resistance to permanent compression set. Silicone elastomers absorb fluids, both gases and liquids, e.g. oils, and they swell as a result thereof.

Each seal insert 56 is a unitary structure comprising two arcuate side or circumferentially extending portions 57 and 58, and two straight end or axially directed portions 59 and 60. The end portions 59 and 60 are designed to fit into respective longitudinal grooves 53 and 54 while the arcuate portions 57 and 58 will fit into the flange grooves 48 and 49, respectively, of a collar segment.

Each side portion of a seal insert is of hollow construction. For convenience in describing the details of construction of the seal insert, the same will be described with reference to the grooves 48 and 49 into which the side portions of the seal are designed to fit. Thus, each side portion 57, for example, is defined by a surface 64 (see FIGS. 9 and 10) which will become disposed adjacent bottom wall 52 of groove 49, an outer side surface 65 to seat against side wall 50 of the groove, a lip surface 66 of frusto-conical configuration, and an inner side surface 67. The meeting edges or corners along which said surfaces of the seal insert meet are rounded off as at 68, 69 and 70. The corner 69 along which the inclined surface 66 and the inside surface 67 meet is disposed radially inwardly of rounded corner 70 along which surfaces 65 and 66 meet. The end surfaces of the seal are designated by reference numerals 71 and 72 respectively.

Circumferentially extending cavities 74 in the side portions of each seal are open as slits 75 in the inside surfaces 67. As appears best in FIG. 10, slit 75 is of lesser width than cavity 74 thereby leaving a lip portion 76 extending throughout the length of the side portion. As appears best in FIG. 8, each cavity 74 extends circumferentially of the seal between end walls 78 and 79 thereof, while the slit 75 terminates at each end 80 thereof short of the end walls of the cavity to leave a wall portion 81 which forms a pocket 82 in each end.

Coil springs 85 are contained in the cavities 74, the springs being of a length such that they tend to expand the seal circumferentially, thus to press one end surface 71 or 72 of the seal insert in one collar segment tight against an end surface of the seal insert of the next adjacent segment. The springs are inserted in the cavities through the slits 75. Plugs 87 are secured in the end portions of the coil springs thereby to provide flat end surfaces for the springs for engagement against the ends 78 and 79 of the cavities. The plugs further serve to provide stability to the end portions of the springs for their retention in the pockets 82.

Preferably, the coil springs 85 are so dimensioned with respect to the circumferential extent of the cavities 74 that, when the joint structure is in fully closed position with the end faces of the collar segments in abutment against each other, the adjacent turns of each coil spring will be in contact with each other along that side 89 (FIG. 8) of the spring which is disposed along the inside circumference thereof. Thus, the springs will offer increased strength radially outwardly against the walls of the cavity as well as providing end-to-end sealing pressure in the critical transition area between adjacent seals. The cross-sectional dimensions of the springs and the cavities 74 are such that when the collar segments are constricted radially inward around the tube sections in joint-closed position, the inside walls which define the cavities will be pressed and closed against the outside of the springs, as appears best in FIG. 11 of the drawings.

If desired, the coil springs 85 may be replaced by other elongated, arcuate support members capable of providing the desired end-to-end sealing pressure between adjacent seals at the side regions thereof. For example, in FIG. 13 there is shown another form 90 for the support members, the same being formed from a flat strip of spring metal bent longitudinally thereof to a cross-sectional configuration of a J, having the end of its shorter leg 91 against the inside wall of the lip portion 76 and the outside surfaces of its longer leg 92 and its shorter leg 91 against opposite walls of the cavity. The springs 90 offer resilient support against the inside walls of the seal and end pressure between adjacent seals.

For constricting the collar segments around the end portions of the tube sections, there is a flexible band 95, of stainless steel, for example, which circumscribes the collar segments. Such flexible band has a band-tightening assembly designated generally by reference numeral 96 for releasably connecting the opposite ends of the band and for constricting the band to circumferentially compress the segments around the tubes. Inasmuch as the details of construction of the illustrated band-tightening assembly 96 do not constitute a novel part of this invention, a detailed description thereof will not be set forth herein. Any suitable band-tightening device may be used, the illustrated tightening device being of double T-bolt type.

Each collar segment has a circumferentially extending shallow channel 98 formed in the outside surface thereof between edge flanges 99, for accommodating the band 95. Intermediate the end walls of a collar segment are two slots 100, one formed in the inside surface of each edge flange 99. The band 95 has projections 102 along the sides thereof which extend into the respective slots thereby to hold the collar segments on the band. The slots 100 are slightly longer than the width of the projection 102 to permit slight relative circumferential movement of the band with respect to the collar segments. To facilitate attachment of the collar segments to the band by means of the connection structure of the projections 102 and slots 100, the projections may be bent to extend radially inwardly from the band thereby to fit within the edge flanges 99. When next the band is tightened around the collar segments, the projections will flex outwardly to be received in the slots 100.

The outside surface of each collar segment may have a plurality of circumferentially extending grooves 104 formed therein which serve primarily to decrease the weight of the coupling.

As thus far described, it will be apparent that when the collar segments are constricted around the tube sections, the arcuate portions 57 and 58 of the elastomer seal inserts will be pressed tight against the outside surfaces of the tube sections in circumferentially continuous regions of engagement around the tube sections, and the straight end portions 59 and 60 of the seal insert of each collar segment will be in flush engagement with corresponding seal end portions in adjacent collar segments. It being an important feature of this invention that the seal inserts provide circumferentially continuous seal regions around the tube sections respectively, the segmented collar is so formed that it may be opened wide enough to receive the tube sections and then constricted around the tube sections to align the arcuate portions of the seal inserts and provide for engagement of the arcuate portions throughout the circumference of the tube sections. To this end the coupling is preferably formed of at least three arcuate segments of equal circumferential extent so that when placed around the tube sections and then constricted for its installation, the ends of the arcuate portions of the inserts will not become spaced from each other. Were the coupling formed of but two semicircular collar segments, it would not be practical to attempt installation from one side of the joint, for in that case the ends of the seal inserts would drag along the outside surfaces of the tubing and would leave spaces between the ends of the inserts.

The coupling is opened by disconnecting the band tightener assembly from one end of the band, the several segments remaining connected to the band, but their ends becoming spaced from respective ends of their adjacent segments. Thus, to provide for alignment of the arcuate portions one with another and to provide for flush engagement of the end portions of the seal inserts one with another as the segments are being tightened around the tube sections, the segments have hinge portions on their ends which become interengaged as the coupling is constricted.

The details of construction for the hinge structures of the illustrated embodiment appear best in FIGURES 14 to 17, a set of complementary parts constituting a hinge being designated by numeral 107. One such part is a small block 108 integral with a side surface 33 of a segment adjacent its end face 35. Block 108 has a recess 109 formed therein opening toward an end face 35. The other part of each hinge structure is a tongue 110 which extends into the recess of part 108. Each segment has two hinge tongues 110 on opposite side surfaces thereof and extending from one end surface of the segment, and has two blocks 108 on opposite side surfaces thereof and adjacent its other end surface whereby the two tongues on each segment will respectively interengage the two recessed blocks of the next adjacent segment. Inside surfaces 112 of each set of tongues on a segment are spaced apart by a distance taken axially of the segmented collar equal to the distance between bottom surfaces 113 of the recesses, the surfaces 112 and 113 being planar and disposed in respective planes perpendicular to the axis of the collar, whereby when the tongues are disposed in the recesses, the segments will be aligned circumferentially with respect to the tube sections.

The outlines of the tongues and recesses are so shaped as to provide for both sliding and pivoting engagement therebetween as the segmented collar is opened at 115 to receive the tube sections, and then closed and constricted around the tube sections. Thus the inside portion 116 of the edge of each hinge tongue slidingly engages the inside portion 117 of its mating recess as the collar is opened and closed to maintain the inside surfaces of adjacent segments aligned when the collar is fully constricted. Interengagement of the inside edges of the tongues and recesses provides for alignment of the inside surfaces of adjacent segments whereby the straight end portion 59 of the seal insert of one segment will close against the straight end portion 60 of the seal of an adjacent segment without any pinching or other misalignment occurring as they are brought together.

While the instant invention has been shown and described herein, in what is conceived to be the most practical and preferred embodiment, it is recognized that departures may be made therefrom within the scope of the invention, which is therefore not to be limited to the details disclosed herein, but is to be accorded the full scope of the claims.

What we claim is:

1. A joint structure for interconnecting the end portions of two tubes arranged in axially aligned relationship, comprising a plurality of arcuate segments arranged to form a collar circumscribing the end portions of the tubes, means for constricting the segments around the tubes, each segment having an inside surface, two end surfaces and two side surfaces, each segment having two grooves formed therein opening in said inside surface and extending in a circumferential direction proximate said side surfaces respectively, and from one end surface to the other end surface, each segment having two end grooves formed in the respective end faces thereof, said end grooves being open to the inside surface grooves, and a unitary seal of elastomer fitted into said grooves whereby those side portions of the seal contained in said inside surface grooves will engage the outside surfaces of said tubes, respectively, and that end portion of the seal contained in an end groove will engage a corresponding end portion of the seal of an adjacent segment, and said side portions of the seals having centrally extending elongated, resilient arcuate support members compressed therein and providing circumferential end to end sealing pressure at the sides of said seal end portions for said engagement of said seal end portions.

2. A joint structure according to claim 1, in which said support members are coil springs of such axial length and number of spring turns that when the segments are closed tight around the tubes, adjacent turns of the coil spring are in engagement with each other.

References Cited in the file of this patent

UNITED STATES PATENTS

| | | |
|---|---|---|
| 938,344 | Schwerd | Oct. 26, 1909 |
| 1,331,986 | Griffin | Feb. 24, 1920 |
| 1,962,291 | Anderson | June 12, 1934 |
| 1,984,806 | Pfefferle | Dec. 18, 1934 |
| 2,162,104 | Mosher | June 13, 1939 |
| 2,319,392 | Dick | May 18, 1943 |
| 2,353,572 | Kuster | July 11, 1944 |
| 2,403,606 | Meyer | July 9, 1946 |
| 2,447,663 | Payne | Aug. 24, 1948 |
| 2,883,211 | Grass | Apr. 21, 1959 |
| 2,913,262 | Cenzo | Nov. 17, 1959 |

FOREIGN PATENTS

| | | |
|---|---|---|
| 543,529 | Great Britain | Mar. 2, 1942 |